US012759188B2

(12) United States Patent
Laukaitis

(10) Patent No.: US 12,759,188 B2
(45) Date of Patent: Oct. 13, 2026

(54) APPARATUS FOR FACILITATING THE ASSEMBLY OF STUDS

(71) Applicant: Daniel Laukaitis, Barre, MA (US)

(72) Inventor: Daniel Laukaitis, Barre, MA (US)

( * ) Notice: Subject to any disclaimer, the term of this patent is extended or adjusted under 35 U.S.C. 154(b) by 260 days.

(21) Appl. No.: 18/769,014

(22) Filed: Jul. 10, 2024

(65) Prior Publication Data

US 2026/0014734 A1 Jan. 15, 2026

(51) Int. Cl.

*B25B 11/00* (2006.01)
*B27M 3/00* (2006.01)
*E04G 21/18* (2006.01)

(52) U.S. Cl.

CPC ....... *B27M 3/0073* (2013.01); *E04G 21/1841* (2013.01)

(58) Field of Classification Search

CPC ......... E04G 21/18; E04G 11/18; B25B 11/02; B25B 11/24; B23Q 3/00; B23Q 9/00
See application file for complete search history.

(56) References Cited

U.S. PATENT DOCUMENTS 4,305,575 A * 12/1981 Bardes .................... B25B 5/142 269/283
4,910,939 A * 3/1990 Cavanagh ............. E04B 1/2604 403/171
5,158,406 A 10/1992 Ulinskas
5,360,212 A * 11/1994 West ....................... B25B 11/02 269/910
5,617,909 A 4/1997 Duginske
5,852,895 A * 12/1998 Sinanan ................. A01G 9/027 47/33
6,983,824 B1 1/2006 Dandurand
8,231,313 B2 7/2012 Sommerfeld et al.
9,062,467 B1 * 6/2015 Hanson ................... B25B 5/142
9,388,540 B2 * 7/2016 Koering .................... E04G 5/14
9,765,805 B2 9/2017 Pond
D927,965 S * 8/2021 Bowron ......................... D8/382
11,591,814 B2 2/2023 Baca et al.
11,628,588 B2 4/2023 Sheldon
11,873,652 B2 1/2024 Bellissimo et al.
(Continued)

FOREIGN PATENT DOCUMENTS

JP 3234601 A 10/1991
KR 101497177 B1 2/2015

*Primary Examiner* — Lee D Wilson
(74) *Attorney, Agent, or Firm* — Lambert Shortell & Connaughton; David J. Connaughton, Jr.; Justin P. Tinger

(57) ABSTRACT

The present disclosure teaches an apparatus for facilitating the assembly of studs used in wall framing. The apparatus may include a rectangular, elongated main body, whose length equals the spacing between two adjacent studs. The apparatus may further include four holders, two on each side of the main body and two at the bottom of the main body. The two bottom holders may respectively connect to the two side holders via a shared edge to enhance structural strength. The shapes and sizes of the four holders may match the shapes and sizes of the studs. The apparatus may be made of fiberglass-reinforced nylon or other lightweight materials. Reinforcement ridges may protrude from the surfaces of the main body and the holders. The reinforcement ridges on or near the edges of the apparatus may be thicker, and/or have smaller gaps in between, than the reinforcement ridges in the middle.

20 Claims, 4 Drawing Sheets

(56) References Cited

U.S. PATENT DOCUMENTS

| | | | | |
|---|---|---|---|---|
| 12,338,618 | B2 * | 6/2025 | Wang | E04B 1/2608 |
| 12,416,162 | B2 * | 9/2025 | Leary | E04F 11/1812 |
| 2003/0233925 | A1 | 12/2003 | Markropoulos | |
| 2016/0002909 | A1 * | 1/2016 | Bowron | E04B 1/3483<br>52/745.03 |
| 2017/0312908 | A1 | 11/2017 | Judge | |
| 2020/0399899 | A1 | 12/2020 | Singleton et al. | |
| 2026/0014734 | A1 * | 1/2026 | Laukaitis | B27M 3/0073 |

* cited by examiner

APPARATUS FOR FACILITATING THE ASSEMBLY OF STUDS

TECHNICAL FIELD

The present disclosure relates to the field of construction tools.

BACKGROUND

A stud is a long, slender framing member used in framing and supporting a building's walls, and sometimes ceilings and other structures. Studs are usually made of wood (most used in residential buildings) or steel, may be placed vertically, horizontally, or sometimes diagonally, and may be either load-bearing or non-load-bearing. Studs are usually made in 2×4, 2×6, or 2×8 pieces. Vertical studs are usually spaced either 16 or 24 inches apart on center (i.e. the distance between the center of a first stud and an adjacent stud is 16 or 24 inches) and form repetitive patterns, with horizontal plates placed in between, above, or below the vertical studs for reinforcement purposes. The horizontal plates may either be long members connecting a plurality of vertical studs on the top or bottom of the studs, or short members connecting two adjacent vertical studs. Therefore, a tool assisting with lining up studs when framing a wall could be helpful for constructors.

The state-of-the-art tools for lining studs up are made of metals such as steel or cast aluminum and are therefore heavy and bulky. Therefore, it could be helpful to introduce a lighter-weight, easier-to-use tool to perform the same job. When a lighter-weight material is applied, it is also important to reinforce the body of the tool accordingly to ensure structural strength.

SUMMARY

The present disclosure teaches an apparatus for facilitating assembly of two vertical studs and one horizontal plate, comprising: a main panel; wherein, a first plurality of reinforcement ridges is protruding from a front surface of the main panel; wherein, the first plurality of reinforcement ridges is horizontal; wherein, among the first plurality of reinforcement ridges, reinforcement ridges on or close to a top edge or a bottom edge of the main panel are thicker than reinforcement ridges on or close to a horizontal central axis of the main panel; a handle connected to the main panel; two side holders to hold the two vertical studs, respectively connected to a left edge and a right edge of the main panel; wherein, each side holder forms a first rectangular cuboid; wherein, a height of the first rectangular cuboid equals a length of the left edge of the main panel; wherein, a horizontal cross-section of the first rectangular cuboid matches a lateral cross-section of the vertical studs; wherein, the side holders are reinforced by a second plurality of reinforcement ridges; two bottom holders to hold the horizontal plate, connected to the bottom edge of the main panel and respectively placed at each end of the bottom edge; wherein, each bottom holder forms a second rectangular cuboid; wherein, a side profile cross-section of the second rectangular cuboid matches a lateral cross-section of the horizontal plate; wherein, the bottom holders are reinforced by a third plurality of reinforcement ridges; wherein, the main panel, the two side holders, and the two bottom holders are made of fiberglass-reinforced nylon.

In some embodiments, each of the side holders is respectively connected to one of the bottom holders via a shared edge.

In some embodiments, all edges of the main panel, the side holders, and the bottom holders include reinforcement ridges.

In some embodiments, a width of the bottom holders equals a height of the side holders.

In some embodiments, among the first plurality of reinforcement ridges, reinforcement ridges on or close to a top edge or a bottom edge of the main panel have smaller gaps in between than reinforcement ridges on or close to a horizontal central axis of the main panel.

In some embodiments, the reinforcement ridges on the edges are thicker than other reinforcement ridges.

In some embodiments, the shared edge includes a reinforcement ridge.

In some embodiments, the second plurality of reinforcement ridges is horizontal.

In some embodiments, the third plurality of reinforcement ridges is parallel to the side profile cross-section of the second rectangular cuboid.

In some embodiments, the two bottom holders and the two side holders are identical in shape and size.

In some embodiments, the second plurality of reinforcement ridges connects to the first plurality of reinforcement ridges.

In some embodiments, the handle is horizontal and centered with respect to the main panel.

In some embodiments, the apparatus further comprising: the two vertical studs held by the two side holders; the horizontal plate held by the two bottom holders.

In some embodiments, bottom ends of the two vertical studs respectively align with bottoms of the side holders.

In some embodiments, the third plurality of reinforcement ridges has larger gaps in between than the first plurality of reinforcement ridges.

In some embodiments, the length of the main panel equals a standard spacing between the two vertical studs on center minus a width of one of the two vertical studs.

In some embodiments, the standard spacing between the two vertical studs is 16 inches or 24 inches.

In some embodiments, wherein the two vertical studs are connected to the horizontal plate with nails or screws.

An apparatus for facilitating assembly of two vertical studs and one horizontal plate, comprising: a main panel; wherein, the main panel is rectangular and elongated in a horizontal direction; wherein, a length of the main panel equals a spacing between the two vertical studs; wherein, a first plurality of reinforcement ridges is protruding from a front surface of the main panel; wherein, the first plurality of reinforcement ridges is horizontal; wherein, among the first plurality of reinforcement ridges, reinforcement ridges on or close to a top edge or a bottom edge of the main panel are thicker than reinforcement ridges on or close to a horizontal central axis of the main panel; a handle connected to the main panel; two side holders to hold the two vertical studs, respectively connected to a left edge and a right edge of the main panel; wherein, each side holder includes a first group of three rectangular surfaces that forms a first rectangular cuboid; wherein, a height of the first rectangular cuboid equals a length of the left edge of the main panel; wherein, a horizontal cross-section of the first rectangular cuboid matches a lateral cross-section of the vertical studs; wherein, among the first group of three rectangular surfaces, a first surface is connected to a left edge or a right edge of the main panel and perpendicular to the main panel; a second surface is connected to the first surface and parallel to the main panel; a third surface is connected to a second surface and parallel to the first surface; wherein, the side holders are reinforced by a second plurality of reinforcement ridges; two bottom holders to hold the horizontal plate, connected to the bottom edge of the main panel and respectively placed at each end of the bottom edge; wherein, each bottom holder includes a second group of three rectangular surfaces that forms a second rectangular cuboid; wherein, a side profile cross-section of the second rectangular cuboid matches a lateral cross-section of the horizontal plate; wherein, among the second group of three rectangular surfaces, a first surface is connected to both the bottom edge of the main panel, and perpendicular to the main panel; a second surface is connected to the first surface and parallel to the main panel; a third surface is connected to a second surface and parallel to the first surface; wherein, the bottom holders are reinforced by a third plurality of reinforcement ridges; wherein, the main penal, the bottom holders, and the side holders are made of fiberglass-reinforced nylon.

BRIEF DESCRIPTION OF THE DRAWINGS

The present disclosure is further illustrated by way of exemplary embodiments, which are described in detail through the accompanying drawings. These embodiments are not limiting, and in these embodiments, the same numbering indicates the same structure, wherein.

DETAILED DESCRIPTION

Figure 1:
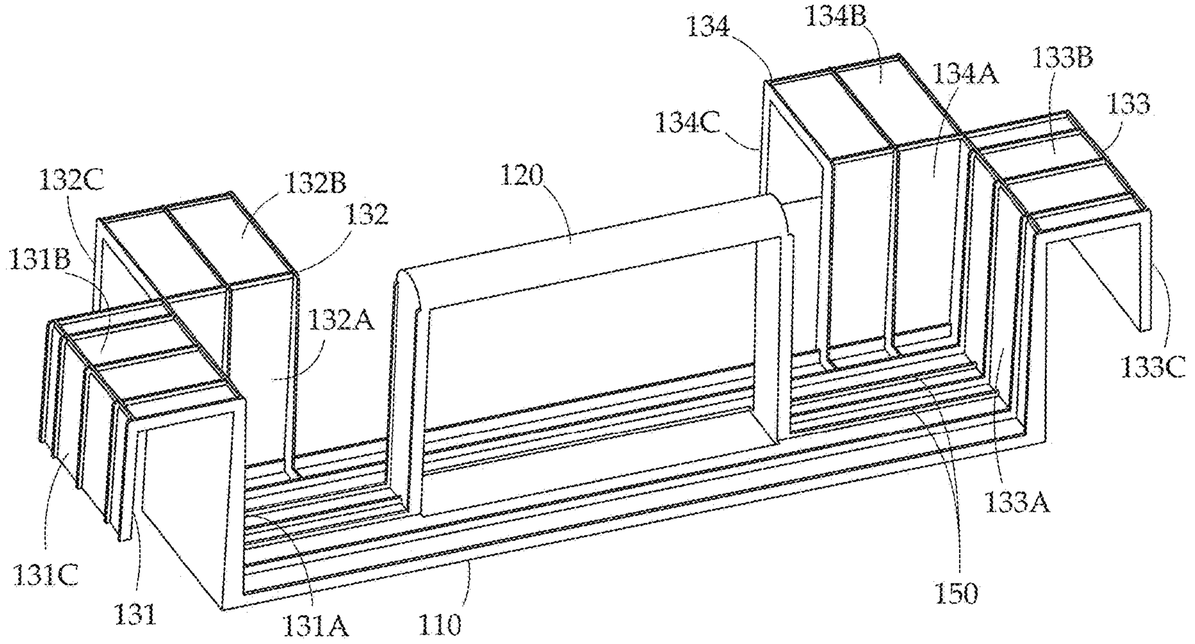
FIG. 1 is an isometric diagram illustrating the structure of an apparatus for facilitating the assembly of studs, according to some embodiments of the present disclosure.

In order to more clearly illustrate the technical solutions of the embodiments of the present disclosure, the accompanying drawings for the description of the embodiments are described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions.

As indicated in the present disclosure and in the claims, unless the context clearly suggests an exception, the words "one," "a," "a kind of," and/or "the" do not refer specifically to the singular but may also include the plural. In general, the terms "include" and "comprise" suggest only the inclusion of clearly identified steps and elements, which do not constitute an exclusive list, and the method or device may also include other steps or elements.

Figure 3:
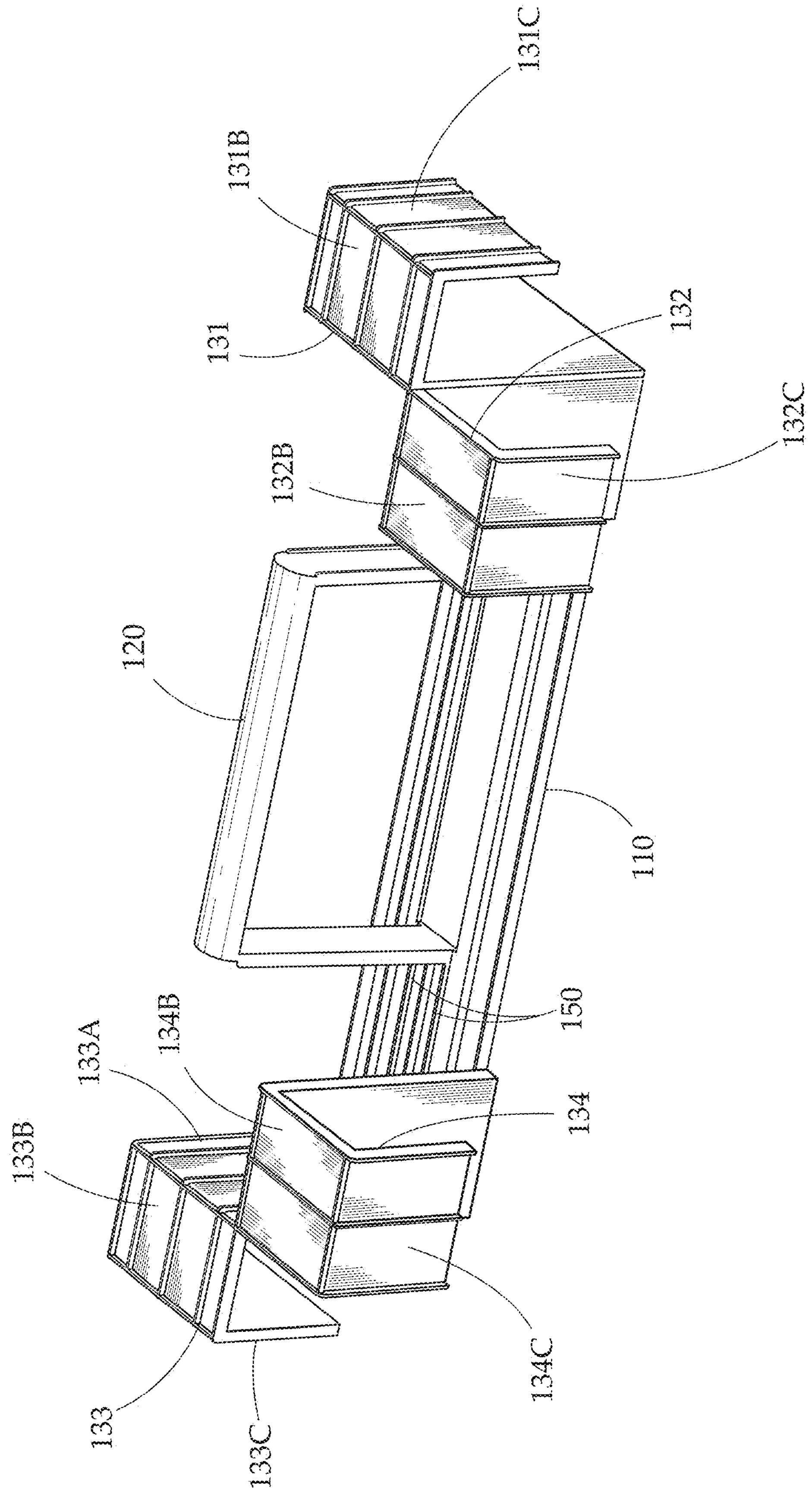
FIG. 3 is another isometric diagram illustrating the structure of an apparatus for facilitating the assembly of studs, according to some embodiments of the present disclosure.

FIG. 1 is an isometric diagram illustrating the structure of an apparatus for facilitating the assembly of studs, according to some embodiments of the present disclosure. For an additional reference, FIG. 3 is another isometric diagram thereof.

In some embodiments, the presently disclosed apparatus may be made of fiberglass-reinforced nylon. Alternatively, the apparatus may also be made of other lightweight materials with sufficient strength.

In some embodiments, the presently disclosed apparatus may have a main panel 110 in the middle. The main panel 110 may be rectangular and elongated in the horizontal direction. Given that the length of the main panel stretches from the rightmost surface of a left vertical stud to the leftmost surface of a right vertical stud, in some embodiments, the length of the main panel 110 may be the standard space (16 or 24 inches) between the centers of two studs in wall framing minus the width of one stud. The length of the main panel 110 may also vary or be customized according to specific construction needs.

In some embodiments, the main panel 110 may include a handle 120 placed at its center. The handle 120 may be horizontal. The handle 120 may protrude from the main panel 110. A user may move and hold the apparatus by the handle 120. The apparatus is usually placed horizontally when in use but can also be placed in different orientations for specific construction needs.

In some embodiments, the main panel 110 may have four stud holders 131, 132, 133, and 134. Two of the stud holders 131 and 133 may be placed on each side of the main panel 110 to hold two vertical studs ("side holders"). Two of the stud holders 132 and 134 may be placed along the bottom of the main panel to hold one horizontal plate ("bottom holders"). In some embodiments, the two holders 132 and 134 are placed at or close to each end of the bottom edge of the main panel.

In some embodiments, the shape of the stud holders may be identical and match the dimensions of the studs. For example, despite its name, a commonly used 2×4 stud is usually 1.5 in×3.5 in. To match the shape of a 2×4 stud, in some embodiments, a holder may be designed to hold a 1.5 in×3.5 in slender member.

For example, in one exemplary embodiment as shown in FIG. 1, a holder may have three surfaces. Together, the three surfaces of the holder may form a hollow rectangular cuboid and hold a commonly used 2×4 stud. The height of the holder may be 3.5 in, and the width of the holder may be 1.5 in. Among the three surfaces, the first one (shown as 131A, 132A, 133A, and 134A in FIG. 1) may be perpendicular to the main panel and connected to the main panel; a second one (shown as 131B, 132B, 133B, and 134B in FIG. 1) may be parallel to the main panel and connected to the first surface; a third one (shown as 131C, 132C, 133C, and 134C in FIG. 1) may be perpendicular and connected to the second surface, farthest away from the main panel. In some embodiments, as shown in FIG. 1, the height of the third surface may be smaller than that of the first surface, which could reduce undesired friction between the presently disclosed apparatus and a surface the constructor operates on, such as a wall, a table, or a floor.

Moreover, in some embodiments, a height of the side holders 131 and 133 may equal a length of a left edge or a right edge of the main panel 110. The side holders 131 and 133 may connect to the main panel 110 via a shared edge between the first surface and the main panel, which is the left edge and/or the right edge of the main panel.

In some embodiments, a width of the bottom holders 132 and 134 may equal a length of a left edge or a right edge of the main panel 110 as well. In these embodiments, the bottom holders 132/134 and the side holders 131/133 may be identical in sizes and shapes. The bottom holders 132 and 134 may connect to the main panel 110 via a shared edge between the first surface and the main panel, which is a part of the bottom edge of the main panel. A left side of the bottom holder 132 may align with the left end of the bottom edge of the main panel 110. A right side of the bottom holder 134 may align with the right end of the bottom edge of the main panel 110.

In some embodiments (as shown in FIG. 1), the two adjacent holders 131 and 132 are connected via the one shared edge of surfaces 131A and 132A. In the same way, the two adjacent holders 133 and 134 are connected via the one shared edge of surfaces 133A and 134A. This feature improves the structural strength of the presently disclosed apparatus. As discussed above, because the presently disclosed apparatus is made of a lightweight material compared to state-of-the-art technologies, ensuring structural strength is crucial.

In some embodiments, the presently disclosed apparatus may be custom-made, for example, 3D-printed, for studs of specific sizes and shapes, or spaced at specific intervals, or form specific patterns.

In some embodiments, the presently disclosed apparatus may be reinforced by fiberglass or other similar materials. In some embodiments, the apparatus may also be reinforced by reinforcement ridges 150 protruding from the surfaces of the main panel 110 and the holders 131, 132, 133, and 134.

For the main panel 110, a first plurality of reinforcement ridges 150 may be placed in the horizontal direction. In some embodiments, the top and bottom edges of the main panel 110 may be more heavily reinforced than the middle part of the main panel. For example, in the exemplary embodiment as shown in FIG. 1, the top and bottom ridges are thicker and/or have smaller gaps in between than the middle ridges. That is because, when a force perpendicular to the length direction is applied to the main panel, the bending stresses are higher on the edges and lower in the middle.

In some embodiments, the side holders 131 and 133 may include a second plurality of reinforcement ridges 150—also, the top and bottom ridges may be thicker than the middle ridges and/or have smaller gaps in between. The second plurality of reinforcement ridges may also be horizontal and connect to the first plurality of reinforcement ridges. Likewise, the bottom holders 132 and 134 may also include reinforcement ridges, wherein all the ridges are on planes perpendicular to the main panel 110. For reinforcement ridges 150 on the holders 131, 132, 133, and 134, like on the main panel, the edgy ridges may be thicker and/or have smaller gaps in between than the middle ridges. In some embodiments, some or all edges of the holders may be reinforced with reinforcement ridges 150. For example, the shared edges between the side holders 131/133 and the bottom holders 132/134 may be reinforced with reinforcement ridges 150. Moreover, in some embodiments, as shown in FIG. 1, the bottom holders 132 and 134 may include thinner/fewer reinforcement ridges 150 than the main panel 110, because the main panel may be subject to higher stresses than the bottom holders.

In some embodiments, all or some edges of the presently disclosed apparatus may also be reinforced with reinforcement ridges 150. In some embodiments, the reinforcement ridges 150 on the edges may be thicker than other reinforcement ridges, since the edges are subject to higher stresses when the apparatus is in use.

Figure 2:
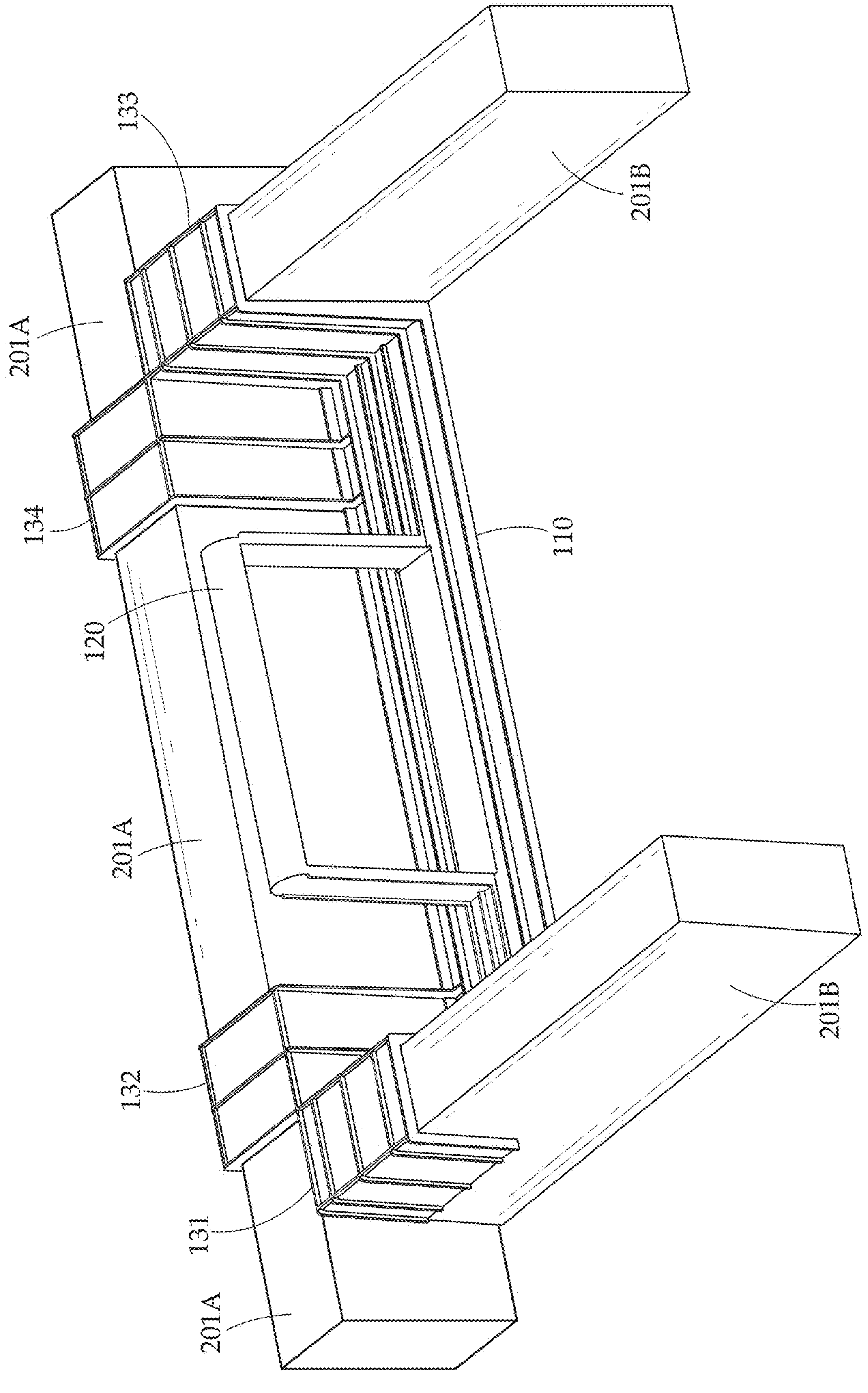
FIG. 2 is a diagram illustrating one exemplary usage of the apparatus for facilitating the assembly of studs, according to some embodiments of the present disclosure.
Figure 4:
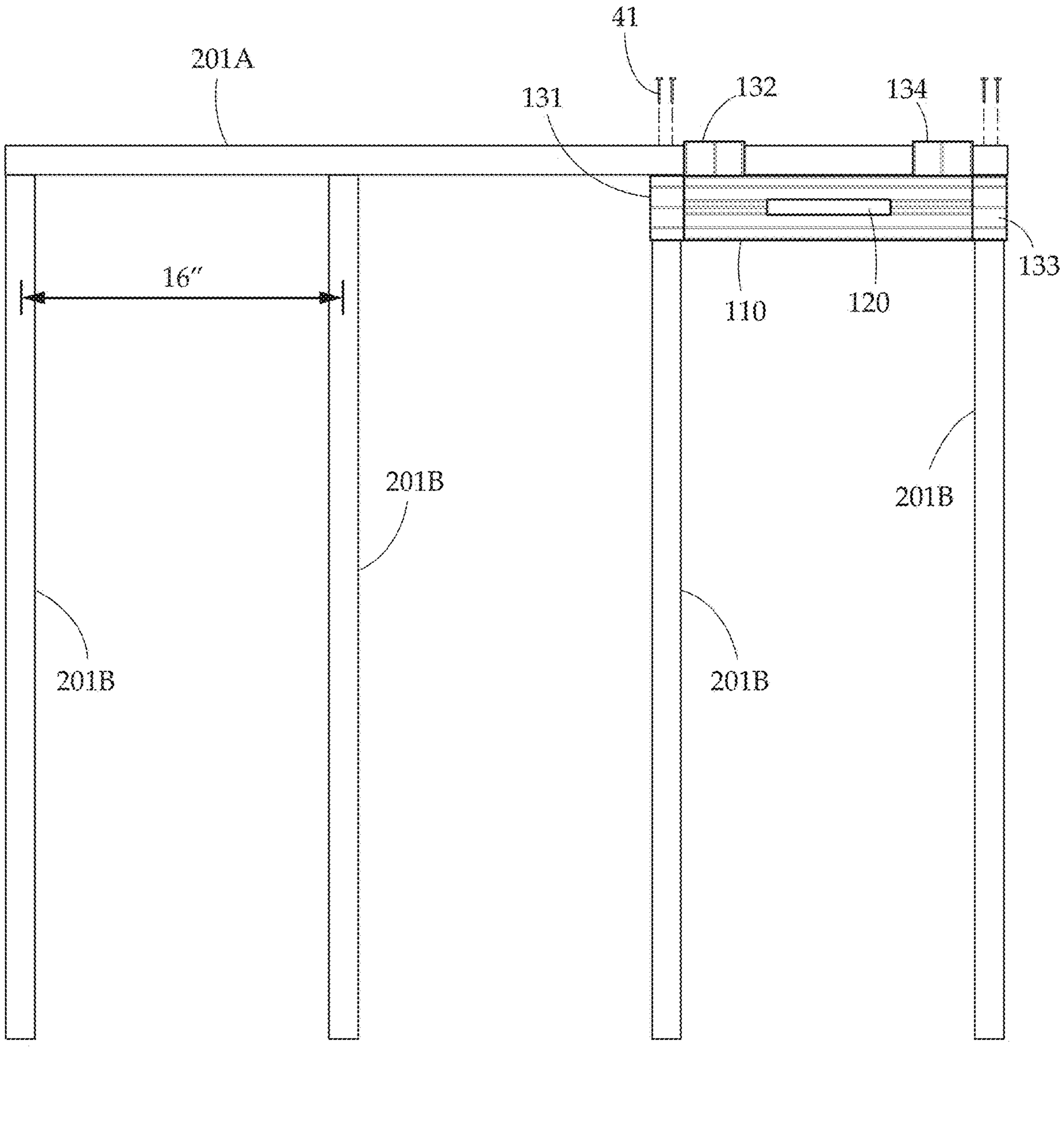
FIG. 4 is another diagram illustrating one exemplary usage of the apparatus for facilitating the assembly of studs, according to some embodiments of the present disclosure.

FIGS. 2 and 4 are diagrams illustrating one exemplary usage of the apparatus for facilitating the assembly of studs, according to some embodiments of the present disclosure.

As discussed above, stud framing often includes creating repetitive patterns with identical vertical studs. The vertical studs are often 2×4, 2×6, or 2×8 and are spaced 16 inches or 24 inches apart on center. Horizontal plates may be placed in between vertical studs for connection and support.

As illustrated in FIG. 2, the presently disclosed apparatus may hold up to two vertical studs 201B and one horizontal plate 201A at a time. The side holders 131 and 133 may hold two vertical studs 201B, which are spaced 16 inches in between (can vary if using different lengths of main panels). The bottom holders 132 and 134 may hold one horizontal plate 201A, which is perpendicular to the vertical studs 201B. In some embodiments, the bottom ends of the two vertical studs 201B may be aligned with the bottom of the side holders 131 and 133. Alternatively, the top ends of the two vertical studs 201B may be aligned with the top of the two side holders 131 and 133. In some embodiments, the ends of the horizontal plate 201A may extend beyond the left of the bottom left holder 132 and the right of the bottom right holder 134.

As illustrated in FIG. 4, after the user secures the horizontal plate 201A and the two vertical studs 201B in position, the user may lift the apparatus and shift it to the right (or the left). The user may align the left (or right) one of the side holders 131/133 with the right (or left) one of the two vertical studs 201B. The user may place a third vertical stud into the right (or left) of the side holders, secure the third vertical stud, and repeat the steps. Hence, a plurality of vertical studs may be aligned and secured accordingly to form a wall.

In some embodiments, the user may also connect the vertical studs 201B to the horizontal plate 201A with nails or screws, in accordance with applicable building codes.

Furthermore, unless explicitly stated in the claims, the use of order, numbers, letters, or other names for processing elements and sequences is not intended to limit the order of the processes and methods of the present disclosure. While various examples have been discussed in the disclosure as currently considered useful embodiments of the invention, it should be understood that such details are provided for illustrative purposes only. The appended claims are not limited to the disclosed embodiments, and instead, the claims are intended to cover all modifications and equivalent combinations within the scope and essence of the embodiments disclosed in the present disclosure.

Similarly, it should be noted that, for the sake of simplifying the presentation of embodiments disclosed in the present disclosure and aiding in understanding one or more embodiments of the present disclosure, various features have been sometimes combined into a single embodiment, drawing, or description. However, this manner of disclosure does not imply that the features required by the claims are more than the features mentioned in the claims. In fact, the features of the embodiments are less than all the features of the single embodiment disclosed in the foregoing disclosure.

In some embodiments, numeric values describing the composition and quantity of attributes are used in the description. It should be understood that such numeric values used for describing embodiments may be modified with qualifying terms such as “about,” “approximately” or "generally". Unless otherwise stated, "about," "approximately" or "generally" indicates that a variation of ±20% is permitted in the described numbers. Accordingly, in some embodiments, the numerical parameters used in the disclosure and claims are approximations, which can change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

In closing, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. An apparatus for facilitating assembly of two vertical studs and one horizontal plate, comprising:

a main panel;
- wherein, a first plurality of reinforcement ridges protrudes from a front surface of the main panel;
  - wherein, the first plurality of reinforcement ridges is horizontal;
  - wherein, among the first plurality of reinforcement ridges, reinforcement ridges on or close to a top edge or a bottom edge of the main panel are thicker than reinforcement ridges on or close to a horizontal central axis of the main panel;

a handle connected to the main panel;

two side holders to hold the two vertical studs, respectively connected to a left edge and a right edge of the main panel;
- wherein, each side holder forms a first rectangular cuboid;
  - wherein, a height of the first rectangular cuboid equals a length of the left edge of the main panel;
  - wherein, a horizontal cross-section of the first rectangular cuboid matches a lateral cross-section of the vertical studs;
- wherein, the side holders are reinforced by a second plurality of reinforcement ridges;

two bottom holders to hold the horizontal plate, connected to the bottom edge of the main panel and respectively placed at each end of the bottom edge;
- wherein, each bottom holder forms a second rectangular cuboid;
  - wherein, a side profile cross-section of the second rectangular cuboid matches a lateral cross-section of the horizontal plate;
- wherein, the bottom holders are reinforced by a third plurality of reinforcement ridges;

wherein, the main panel, the two side holders, and the two bottom holders are made of fiberglass-reinforced nylon.

2. The apparatus as in claim 1, wherein each of the side holders is respectively connected to one of the bottom holders via a shared edge.

3. The apparatus as in claim 1, wherein all edges of the main panel, the side holders, and the bottom holders include reinforcement ridges.

4. The apparatus as in claim 1, wherein a width of the bottom holders equals a height of the side holders.

5. The apparatus as in claim 1, wherein, among the first plurality of reinforcement ridges, reinforcement ridges on or close to a top edge or a bottom edge of the main panel have smaller gaps in between than reinforcement ridges on or close to a horizontal central axis of the main panel.

6. The apparatus as in claim 3, wherein the reinforcement ridges on the edges are thicker than other reinforcement ridges.

7. The apparatus as in claim 2, wherein the shared edge includes a reinforcement ridge.

8. The apparatus as in claim 1, wherein the second plurality of reinforcement ridges is horizontal.

9. The apparatus as in claim 1, wherein the third plurality of reinforcement ridges is parallel to the side profile cross-section of the second rectangular cuboid.

10. The apparatus as in claim 1, wherein the two bottom holders and the two side holders are identical in shape and size.

11. The apparatus as in claim 8, wherein the second plurality of reinforcement ridges connects to the first plurality of reinforcement ridges.

12. The apparatus as in claim 1, wherein the handle is horizontal and centered with respect to the main panel.

13. The apparatus in claim 1, further comprising:

the two vertical studs held by the two side holders;

the horizontal plate held by the two bottom holders.

14. The apparatus in claim 1, wherein bottom ends of the two vertical studs respectively align with bottoms of the side holders.

15. The apparatus as in claim 1, wherein, the third plurality of reinforcement ridges has larger gaps in between than the first plurality of reinforcement ridges.

16. The apparatus as in claim 1, wherein, the length of the main panel equals a standard spacing between the two vertical studs on center minus a width of one of the two vertical studs.

17. The apparatus as in claim 16, wherein, the standard spacing between the two vertical studs is 16 inches or 24 inches.

18. The apparatus as in claim 13, wherein the two vertical studs are connected to the horizontal plate with nails or screws in accordance with local building codes.

19. An apparatus for facilitating assembly of two vertical studs and one horizontal plate, comprising:

a main panel;
- wherein, the main panel is rectangular and elongated in a horizontal direction;

wherein, a length of the main panel equals a spacing between the two vertical studs;

wherein, a first plurality of reinforcement ridges protrudes from a front surface of the main panel;

wherein, the first plurality of reinforcement ridges is horizontal;

wherein, among the first plurality of reinforcement ridges, reinforcement ridges on or close to a top edge or a bottom edge of the main panel are thicker than reinforcement ridges on or close to a horizontal central axis of the main panel;

a handle connected to the main panel;

two side holders to hold the two vertical studs, respectively connected to a left edge and a right edge of the main panel;

wherein, each side holder includes a first group of three rectangular surfaces that forms a first rectangular cuboid;

wherein, a height of the first rectangular cuboid equals a length of the left edge of the main panel;

wherein, a horizontal cross-section of the first rectangular cuboid matches a lateral cross-section of the vertical studs;

wherein, among the first group of three rectangular surfaces, a first surface is connected to a left edge or a right edge of the main panel and perpendicular to the main panel;

a second surface is connected to the first surface and parallel to the main panel;

a third surface is connected to a second surface and parallel to the first surface;

wherein, the side holders are reinforced by a second plurality of reinforcement ridges;

two bottom holders to hold the horizontal plate, connected to the bottom edge of the main panel and respectively placed at each end of the bottom edge;

wherein, each bottom holder includes a second group of three rectangular surfaces that forms a second rectangular cuboid;

wherein, a side profile cross-section of the second rectangular cuboid matches a lateral cross-section of the horizontal plate;

wherein, among the second group of three rectangular surfaces, a first surface is connected to both the bottom edge of the main panel, and perpendicular to the main panel;

a second surface is connected to the first surface and parallel to the main panel;

a third surface is connected to a second surface and parallel to the first surface;

wherein, the bottom holders are reinforced by a third plurality of reinforcement ridges;

wherein, the main penal, the bottom holders, and the side holders are made of fiberglass-reinforced nylon.

20. The apparatus as in claim 19, wherein, the length of the main panel equals a standard spacing between the two vertical studs on center minus a width of one of the two vertical studs.

* * * * *